3,646,850

1

DETENT MECHANISM FOR BRAKE BOOSTER

BACKGROUND OF THE INVENTION

This invention relates to a hydraulic boost device for use in the brake system of an automotive vehicle.

Because of their smaller size and lower weight, hydraulic brake boosters are expected to be used in lieu of vacuum boosters in vehicles having power assisted brakes in the near future. Such a device is disclosed in U.S. patent application Ser. No. 793,923, filed Jan. 16, 1969, owned by the assignee of the present invention and incorporated herein by reference. This unit utilizes the pressurized fluid produced by the vehicle's power steering pump to provide a hydraulic assist to the vehicle operator when the brakes are applied. The device disclosed in the aforementioned application permits manual actuation of the brakes should the supply of pressurized fluid to the unit be terminated or should a malfunction in the valve mechanism fail to communicate fluid into the unit. After an initial malfunction, the valve sometimes resumes normal operation after the brakes have been partially applied manually. When this occurs, the vehicle stops abruptly, often damaging the vehicle and injuring its passengers.

SUMMARY OF THE INVENTION

Therefore, an important object of my invention is to prevent the valve mechanism from admitting fluid into a brake booster after an initial valve malfunction has initiated manual actuation of the brakes.

Another important object of my invention is to provide coupling means that automatically disconnects the operator-operated control rod from the valve actuating mechanism of the brake booster when a valve malfunction has initiated a manual brake application.

A further object of my invention is to provide a coupling means that automatically disconnects the operator-operated control rod from the valve actuating mechanism when the valve malfunctions, but which automatically recouples the control rod to the valve actuating mechanism when the brakes are released to permit normal operation of the brake booster if the valve mechanism functions normally on future brake actuations.

DESCRIPTION OF THE DRAWINGS

FIG. 1 is a schematic view of a vehicle hydraulic system with a brake booster made pursuant to the teachings of my present invention illustrated in cross section;

FIG. 2 is an enlarged, fragmentary, cross-sectional detail view of the coupling mechanism used in the brake booster illustrated in FIG. 1;

FIG. 3 is an enlarged, fragmentary, cross-sectional detail view, similar to FIG. 2, but illustrating the position of the various elements of the coupling mechanism while the latter is releasing; and FIG. 4 is an enlarged, fragmentary, cross-sectional, detail view, similar to FIGS. 2 and 3, but illustrating the position of the various elements of the coupling mechanism after the latter has released.

DETAILED DESCRIPTION

Referring now to the drawings, a brake booster 10 includes a housing 12 having an inlet port 14, an outlet port 16, and a return or exhaust port 18. The inlet port 14 is communicated with the high pressure side of a power steering pump 20, and the outlet port 16 is communicated with the inlet of a power steering gear 22. The exhaust port 18 is communicated to the low pressure side of the pump 20 as is the outlet port of the power steering gear 22.

A piston 24 is slidable in a longitudinally extending bore 26 within the housing 12. One end of the piston 24 is slidably received in a boost chamber 28 within the housing 12. A rod 30 connects the other end of the piston 24 with a standard master cylinder (not shown) mounted on the left side of the housing 12 viewing FIG. 1. Movement of the piston 24 to the left develops pressure in the master cylinder in the usual manner to apply the vehicle's brakes. A return spring 32 also engages the other end of the piston 24 to return the latter to its normal position after the brakes are released.

A spool valve 34 is slidable in a bore 36 within the housing 12 and is adapted to control fluid communication between the inlet 14, the outlet 16, and the boost chamber 28. In the position illustrated in FIG. 1, the spool valve 34 communicates substantially all of the fluid that flows into the inlet directly to the outlet, and vents the chamber 28 to the low pressure side of the pump 20 through the exhaust port 18. When the vehicle operator depresses the brake pedal, spool valve 34 is shifted to the left viewing FIG. 1, terminating fluid communication between the chamber 28 and the exhaust port 18, and simultaneously directing a portion of the fluid flowing into the inlet 14 through radially extending passages 38 and longitudinally extending passages 40 in the spool valve 34. Details of the construction and operation of the spool valve 34 are described in copending U.S. patent application Ser. No. 13,415, filed Feb. 24, 1970, owned by the assignee of the present invention and incorporated herein by reference.

An operator-operated control rod 42 is slidably mounted in yet another bore 44 within the housing 12. One end of the control rod 42 is secured to the usual brake pedal (not shown) in the vehicle operator's compartment and the other end of the rod 42 is slidably supported in a blind bore 46 formed in the end of the piston 24. A circumferentially extending groove 48 is formed in the rod 42 and is adapted to receive a plurality of force-transmitting elements or spheres 50 spaced circumferentially around the control rod 42. A second groove 52 having a substantially greater axial length than that of the groove 48 is also formed in the rod 42, and is separated from the groove 48 by a ridge 54. A conical spring 56 is disposed between the piston 24 and a snapring 58 on the rod 42 and yieldably biases the control rod 42 toward the right viewing FIG. 1.

A sleeve 60 is slidably mounted on the control rod 42 and has a substantially greater inside diameter than the diameter of the rod 42. A pair of inwardly projecting abutments 62, 64 are provided on opposite ends of the sleeve 60 and slidably engage the control rod 42. The abutment 62 is normally disposed between the snapring 58 and the forward edge of the groove 48 and is provided with a sloping surface 66 that engages one side of the force-transmitting elements or spheres 50. A resilient member 68 is disposed between the other abutment 64 and a washer 70, the outside diameter of which slidably engages the inside diameter of the sleeve 60. The resilient member 68 yieldably biases the sloping forward surface 69 of the washer 70 into engagement with the other side of the spheres 50. Access openings 72 are provided through the sleeve 60 so that the spheres 50 may be placed in the groove 48.

One end of a pair of levers 74 are connected by pivots 76 to a bracket 78 mounted on the piston 24. The other ends of the levers 74 are pivotally connected to the spool valve 34 as at 80. A pin 82 on the sleeve 60 engages slots 84 on the levers 74, providing a pivotal connection between the levers and the sleeve. The levers 74 are disclosed in detail in copending U.S. patent application Ser. No. 35,800, filed May 8, 1970, owned by the assignee of the present invention and incorporated herein by reference.

MODE OF OPERATION

In operation, the spring 68 acting through the washer 70 normally forces the spheres 50 against the sloping face 66 of the abutment 62 and against the forward edge of the groove 48, thereby locking the sleeve 60 to the control rod 42 for movement therewith. When the brakes are applied, the rod 42, and therefore the sleeve 60, are forced to the left viewing FIG. 1. Movement of the sleeve 60, acting through the levers 74, shifts the spool valve 34 to a position admitting fluid into

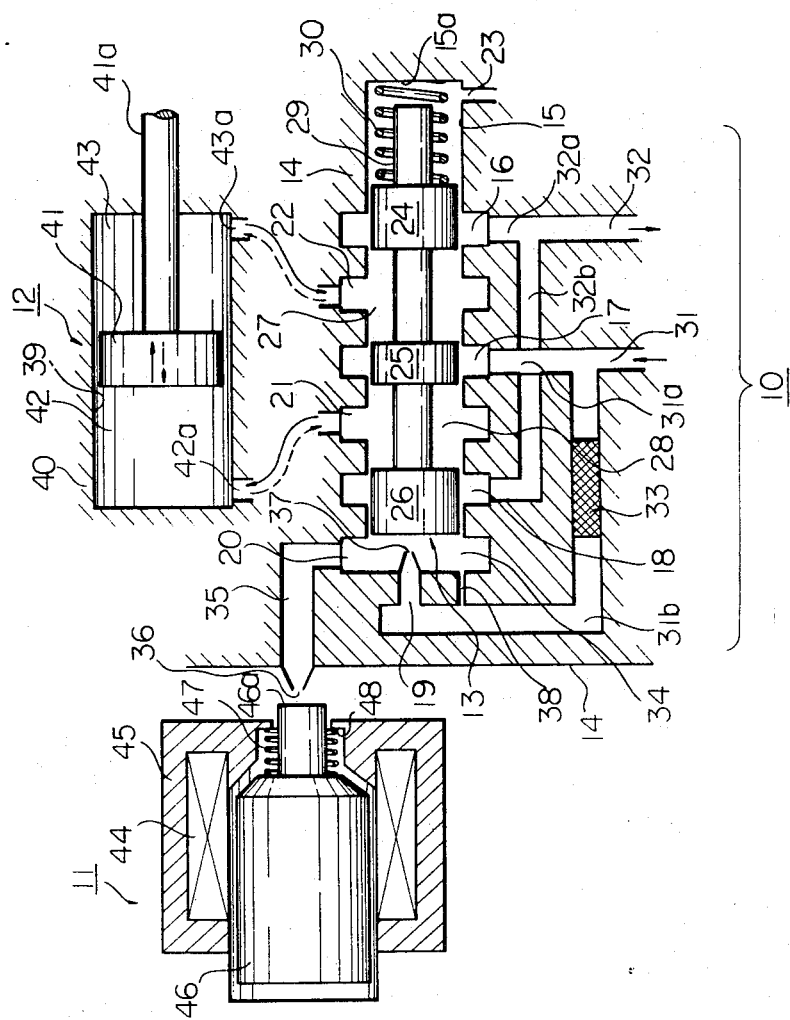

HYDRAULIC SHIFT VALVE

This invention relates to a hydraulic shift valve having a servomechanism to shift relative positions of an actuating element, a major application of the shift valve being in a transmission system of a motor vehicle. The invention relates, more particularly, to a hydraulic shift valve, the movement of which brings about the application or release of the servomechanism to cause a ratio change of the gear elements of the transmission system.

Among the prior art hydraulic shift valves used in an automotive transmission system is a valve of pin pilot type using a pilot valve to convert electric signals into mechanical thereby to move a main valve. The pilot valve is operated by a torque motor which is complicated in construction so as to add to the production cost of the valve as a whole. The use of the pilot valve and torque motor, moreover, is reflected by a retarded response of the main valve to the operating signals.

Another typical practice is to use a single-nozzle valve of flapper type, in which an extra amount of operating fluid is required because of a loss resulting from the draining off of a signal pressure when the nozzle is open and, as a result, the hydraulic pump tends to be overloaded. It may be added that the use of an oil-immersed moving coil as is customary in the flapper type shift valve results in a complicated construction of the valve assembled.

It is, therefore, an object of the invention to provide an improved hydraulic shift valve which is simple in construction and economical to manufacture.

Another object is to provide a hydraulic shift valve in which a loss in the operating fluid as experienced in draining off the signal pressure in the known shift valves is reduced to a minimum whereby the hydraulic pump is saved from application of an overload.

Still another object is to provide a hydraulic shift valve offering a quick response to the operating signals.

In order to accomplish these objects, the invention proposes to construct a hydraulic shift valve by the combination of a conventional solenoid device and a hydraulic fluid circuit with a nozzle and an orifice, which orifice is closed by a main control valve when the nozzle is open thereby to prevent the operating fluid from being drained off.

The accompanying drawing contains a schematic view showing in section a preferred embodiment of this invention.

In the drawing, the hydraulic shift valve implementing the invention is made up of three coacting units—a spool valve unit 10 which is interposed in a hydraulic fluid circuit, a solenoid device 11 serving as a main control valve to control the operation of the spool valve unit 10, and a servo unit 12 operatively connected to and controlled by the spool valve unit 10 to actuate an associated gear element (not shown) of the transmission system. The spool valve unit 10 is herein shown as held in its neutral position.

The spool valve unit 10 comprises a spool valve element 13 which is accommodated in a casing portion 14. The casing portion 14 is provided with a cylindrical cavity 15 in which the spool valve element 13 is slidable. The cavity 15 has a plurality of ports 16, 17, 18, 19, 20, 21, 22 and 23 in communication therewith. The spool valve element 13 has lands 24, 25 and 26, grooves 27 and 28 separating the lands, and a reduced end 29. A compression spring 30 is provided between the land 24 and the opposite end wall 15a of the cavity 15 whereby the spool valve element 13 is at all times urged away from the end 15a of the cavity. The compression of the spring 30 is determined to overcome a predetermined fluid pressure acting upon the land 26.

The ports 17 and 19 communicate with a fluid inlet conduit 31 through branch conduits 31a and 31b, respectively, while the ports 16 and 18 communicate with a fluid discharge conduit 32 through branch conduits 32a and 32b, respectively. The port 23 communicates with an oil sump (not shown) to drain off a fluid. If desired, an oil filter 33 may be provided anywhere in the branch conduit 31b, as shown.

Between the port 19 and land 26 is formed a fluid chamber 34 which communicates with the port 20. The port 20, in turn, communicates with a conduit 35 which is opened to the outside through a restriction or nozzle 36. Between the port 19 and fluid chamber 34 is provided a main orifice 37. The fluid chamber 34 also communicates with the branch conduit 31b through a reduced hole 38, which serves as an auxiliary orifice.

The nozzle 36 is sized to be greater in the effective sectional area than the orifice 37 for the reason hereinafter discussed.

The lands and grooves of the spool valve element 13 are relatively positioned in such a manner that: when the valve element 13 is held in the position closest to the end wall 15a, then the port 16 communicates with the port 22 through the groove 27, the port 17 communicates with the port 21 through the groove 28, and the port 18 is closed; and when the valve element 13 is moved to the position remotest from the end wall 15a, then the fluid communication between the ports 16 and 22, between the ports 17 and 21 are all blocked and instead the ports 17 and 18 are permitted to communicate with the ports 22 and 21 through the grooves 27 and 28, respectively.

The servo unit 12 which is controlled by the spool valve unit 10 has a bore 39 formed in a casing portion 40. The bore 39 is separated by a piston 41 into two fluid chambers 42 and 43 having ports 42a and 43a which communicate with the ports 21 and 22, respectively, of the spool valve unit 10. The piston 41 is connected to an actuating member (not shown) of a gear element (not shown) through a piston rod 41a.

The solenoid device 11 to control the spool valve unit 10 has, as customary, a solenoid coil 44 accommodated in a housing 45 and connected to a suitable source (not shown) of electric power, and an armature or moving core 46 surrounded by the solenoid coil 44. The moving core 46 has formed on one side thereof a valve head 46a which is directed in a face-to-face relationship toward the nozzle 36 of the conduit 35 of the spool valve unit 10. A compression spring 47 is provided between the moving core 46 and a spring seat 48 formed in the housing 45 whereby the moving core 46 and accordingly the valve head 46a are normally held in their retracted positions, namely, positions withdrawn from the nozzle 36, keeping the nozzle 36 open to the air.

When, in operation, the solenoid device 11 is actuated with the solenoid coil 44 excited, then the moving core 46 protrudes against the action of the compression spring 47 so that the valve head 46 is brought into closing contact with the nozzle 36 of the conduit 35. The nozzle 36 being closed, the fluid pressure in the fluid chamber 34 communicating with the conduit 35 increases. The spool valve element 13 is moved to its one extreme position, namely, toward the end wall 15a against the action of the spring 30 until the reduced end 29 thereof contacts the end wall 15a. With the spool valve element 13 in this position, the port 17 communicates with the port 21 through the groove 28 defined by the lands 25 and 26, so that the fluid pressure in the inlet conduit 31 is carried into the chamber 42 through the port 42a as indicated by an arrow in solid line, causing the piston 41 to move in the direction of arrow in a solid line. The fluid in the chamber 43 is now flown into the groove 27 through the ports 43a and 22 as indicated by an arrow in a solid line and drained off through the port 16 and outlet branch conduit 32a.

When, now, the solenoid coil 44 is deenergized, then the moving core 46 becomes retracted so that the valve head 46a leaves the nozzle 36, which is consequently opened. The fluid existing in the conduit 35 is then discharged through the nozzle 36 for recollection. The fluid in the branch conduit 31b leading from the inlet conduit 31 is thus permitted to flow into the fluid chamber 34 through the orifice 37. The orifice 37 being sized to be smaller in the effective sectional area than the nozzle 36, the lever of the fluid pressure in the fluid chamber 34 decreases as the fluid in the conduit 35 is discharged. In this condition, the compression of the spring 31 overcomes the fluid pressure in the fluid chamber 34 so that the spool valve element 13 is caused to move away from the end wall 15a to the other extreme position through its neutral position which is illustrated. The port 17 is permitted to communicate with the port 22 and the fluid in the branch conduit 31a is transferred to the chamber 43 of the servo unit 12 through the groove 27 as indicated by an arrow in a broken line. The fluid pressure existing in the inlet conduit 31 is in this manner led into the chamber 43 whereby the piston 41 is moved in a direction of the arrow in a broken line. The fluid in the chamber 42 is drawn to the groove 28 through the ports 42a and 21 as indicated by an arrow in a broken line and is drained off through the port 18 and conduit 32b. Thus, the spool valve element 13 is brought into the position remotest from the end wall 15a and as a result the land 26 thereof closes the orifice 37. The fluid in the branch conduit 31b is now prohibited from being passed into the fluid chamber 34 through the port 19, preventing the waste of hydraulic fluid. If, in this instance, fluid communication between the conduit 31b and fluid chamber 34 is completely blocked off, the fluid in the conduit 31b would be prevented from entering the chamber 34 even when the nozzle 36 is closed by the valve head 46a for a second time. To avoid such inconvenience, there is provided between the conduit 31b and chamber 34 a reduced hole 38 serving as an auxiliary orifice. Due to the provision of the reduced hole or auxiliary orifice 38, a limited amount of fluid pressure is at all times transferred from the conduit 31b to the fluid chamber 34. When, therefore, the nozzle 36 is closed by the valve head 46a with the orifice 37 concurrently closed by the land 26 of the spool valve element 13, then the fluid pressure in the chamber 34 rises appreciably with the fluid passed through the auxiliary orifice 38. The spool valve element 13 is consequently moved slightly from the orifice 37, permitting the fluid in the conduit 31b to flow into the fluid chamber 34 through the port 19. Actuation of the solenoid device 11 is thus immediately responded to by the spool valve element 13.

What is claimed is:

1. A hydraulic shift valve for controlling a servo unit having an actuating element, comprising a casing having therein a fluid chamber and a valve chamber having ports communicating with said servo unit, a spool valve element in said valve chamber, a spring for biasing said spool valve element in one direction, a fluid pressure source, a fluid conduit communicating with said fluid pressure source and opening into said valve chamber, a main orifice communicating with said fluid conduit and opening into said fluid chamber, a nozzle leading from said fluid chamber and opening to the outside of said casing, a solenoid device for selectively closing and opening said nozzle, said nozzle being larger in effective sectional area than said main orifice, and an auxiliary orifice in said casing communicating with said fluid conduit and opening into said fluid chamber and communicating with said nozzle at all times, said spool valve element being movable when said nozzle is closed by said solenoid device, against the action of said spring to one extreme position to open said main orifice and to deliver a fluid pressure into one of said ports thereby to move the actuating element of said servo unit to one extreme position and, when said nozzle is opened said spool valve element being movable by the action of said spring to the other extreme position to close said main orifice and to deliver a fluid pressure to the other of said ports thereby to move said actuating element to the other extreme position while at the same time the fluid is passed into said nozzle and fluid chamber through said auxiliary orifice so as to minimize the amount of fluid to be discharged from said nozzle to the outside of said casing.

* * * * *